Aug. 23, 1955

A. D. ARSEM 2,716,218

FREQUENCY VARIATION CIRCUIT

Filed June 6, 1952

INVENTOR.
ALVAN D. ARSEM

BY Charles H. Brown
ATTORNEY 2,716,218
Patented Aug. 23, 1955

2,716,218

FREQUENCY VARIATION CIRCUIT

Alvan Donald Arsem, Liverpool, N. Y., assignor to Radio Corporation of America, a corporation of Delaware Application June 6, 1952, Serial No. 292,103

11 Claims. (Cl. 332—28)

This invention relates to frequency variation circuits, and more particularly to reactance tube circuits for controlling the frequency of an oscillator.

It is known to those skilled in the art to which this invention relates that the frequency of an oscillator may be controlled and/or varied by means of a tube coupled to such oscillator and connected to act as an electronic simulated reactance. Such a tube is termed a "reactance tube" and generally has its anode coupled substantially directly to the tank circuit of the oscillator and its control grid coupled to the tank circuit through a 90° phase shift network or impedance which includes one or more reactive elements. In this way, a quadrature circuit is set up and the tube is caused to act as a reactance, with in effect a 90° phase relation between the oscillatory voltage across the anode and cathode of the tube and the oscillatory anode current.

If the grid voltage applied to the reactance tube is varied, the transconductance or mutual conductance of the tube is also varied to vary the reactance (either inductive or capacitive, depending upon the direction of phase shift) injected into the oscillatory circuit, thus varying the frequency of the oscillator. Conventional reactance tube circuits are usually limited with respect to the percentage frequency variation or frequency swing that can take place. This is due to the fact that when the frequency deviation becomes large, the reactance of the reactive elements in the usual reactance tube phase shift network changes, changing the phase shift of such network from 90°. Due to this failure to maintain a 90° phase shift, a resistive component appears between anode and cathode of the reactance tube, and hence across the oscillator tank circuit. In other words, the apparent shunt resistance across the oscillator tank circuit decreases (from its value of substantially infinity when a 90° phase shift is maintained in the phase shift network) when the phase shift network fails to maintain a 90° phase shift. This decrease in apparent shunt resistance across the oscillator tank circuit results in undesirable amplitude modulation of the oscillator output.

An object is to provide a reactance tube circuit in which the allowable frequency deviation is increased as compared to conventional circuits.

A further object is to devise a reactance tube circuit in which a 90° phase shift in the phase shifting portion of the circuit is maintained throughout a larger frequency swing than is possible in conventional circuits.

A still further object is to devise a reactance tube circuit for an oscillator in which the shunt resistance component provided by such tube across the oscillator tank circuit is not decreased as the oscillator frequency is deviated, even through a large frequency deviation.

Yet another object is to provide a novel reactance tube circuit which utilizes a phase shift compensating tube in the phase shift network of the reactance tube.

The foregoing and other objects of the invention will be best understood from the following description of some exemplifications thereof, reference being had to the accompanying drawing, wherein.

The objects of this invention are accomplished, briefly, in the following manner: A reactance tube is coupled to an oscillator tank circuit in a more or less conventional manner, and this reactance tube has a 90° phase shift network coupled between its anode and grid, in order to cause the tube to act as an electronic simulated reactance. A compensating tube is provided in the phase shift network to serve as a variable impedance therein, and the same signal that changes the effective reactance of the reactance tube circuit is applied to the compensating tube to vary the effective impedance and therefore also the phase shift of the phase shift network, to compensate for variations of phase shift arising in such network due to variations in frequency of the oscillator.

Figure 1:
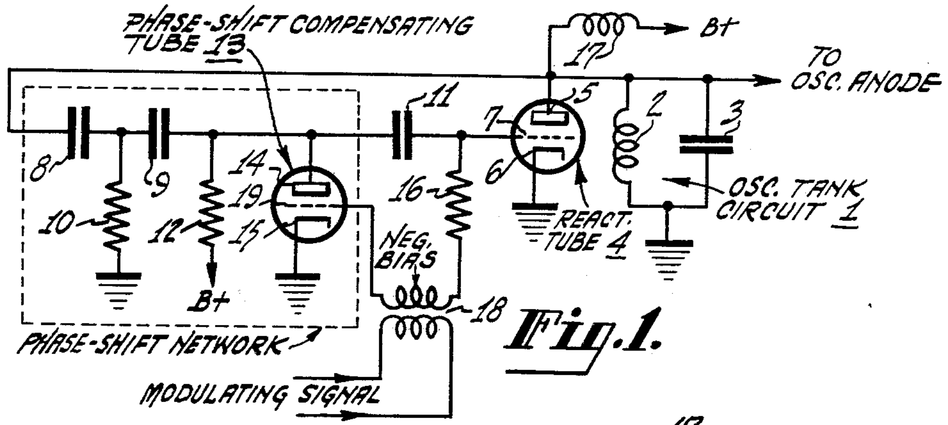
Fig. 1 is a schematic diagram of one circuit arrangement according to this invention.

Referring now to Fig. 1, the oscillator tank circuit 1, with which the reactance tube circuit of this invention is to be used, consists of a parallel-connected inductance 2 and capacitance 3, one end of this parallel combination being connected to the anode of a suitable vacuum tube (not shown) operating as an oscillator and the opposite end of this combination being connected to ground. The anode-cathode path of an evacuated electron discharge device 4 operating as a reactance tube is connected across tank circuit 1, anode 5 of device 4 being connected directly to the high potential (upper) end of the tank circuit and cathode 6 of device 4 being grounded and thereby connected to the grounded (lower) end of the tank circuit.

A phase shift network is connected between the anode 5 and grid 7 of tube 4, in order to provide a phase difference of 90° between the oscillatory voltages fed to said anode and grid from the tank circuit 1 and in order to provide oscillatory anode current through tube 4 which is in phase quadrature with the voltage across the tank circuit 1, thus causing tube 4 to function as an electronic simulated reactance. One plate of a capacitor 8 is connected directly to anode 5 and the other plate of this capacitor is connected to one plate of a capacitor 9. A resistor 10 is connected from the common junction point of capacitors 8 and 9 to ground. The other plate of capacitor 9 is connected through a coupling capacitor 11 which provides negligible phase shift the capacitance of this capacitor being much greater than that of capacitors 8 and 9) for oscillatory frequency energy passing therethrough, to reactance tube grid 7. One end of a resistor 12 is connected to the positive terminal of a source of unidirectional potential (not shown), while the other end thereof is connected to the common junction point of capacitors 9 and 11. The anode 14 of a phase shift compensating tube 13 is connected to the common junction point of capacitors 9 and 11 and to the upper end of resistor 12, while the cathode 15 of this tube is grounded. Since the negative terminal of the source of unidirectional potential is also grounded, in effect the resistance afforded by the anode-cathode path 14–15 of tube 13 is in parallel with the resistance 12. To provide the proper bias for tube 4, a negative bias voltage is applied to the midpoint of the secondary of a transformer 18; one end of said secondary is connected through a resistor 16 to grid 7. To provide anode potential for tube 4, the positive terminal of the unidirectional source is connected to anode 5 through a choke 17. The reactance tube phase shift network referred to, which is connected between anode 5 and grid 7 of reactance tube 4, includes capacitor 8, capacitor 9, resistor 10, and the parallel combination of resistor 12 and the anode-cathode resistance of tube 13, since capacitor 11, as stated, provides negligible phase shift.

That end of the secondary of transformer 18 opposite to that connected to resistor 16 (and grid 7) is connected to grid 19 of compensating tube 13. In this way, the negative bias voltage applied to the midpoint of the secondary of transformer 18 is effective on grid 19 to bias tube 13 negatively.

In order to control or modulate the frequency of the oscillator (which includes tank circuit 1) by means of the reactance tube circuit illustrated, a modulating signal (which could alternatively be a control signal) is applied to the primary of transformer 18. Since opposite ends of the secondary of this transformer are connected to grids 7 and 19, respectively, the control or modulating signal changes the bias on both tubes 4 and 13 at the rate of such signal, but in opposite direction or opposite sense. In other words, at any instant the signal applied to the compensating tube 13 is of opposite polarity to the signal applied to the reactance tube 4.

If the phase shift through elements 8, 9, 10, 12, 13 is ninety degrees the anode current through tube 4 will be in phase quadrature with the voltage across the oscillator tank circuit 1, thus causing tube 4 to act as an electronic simulated capacitance across such tank circuit. The magnitude of this capacitance is, of course, a function of the mutual conductance ($g_m$) of tube 4. Thus, if the modulating voltage applied to grid 7 of the tube 4 is positive thereby overcoming some of the bias applied to such grid, the mutual conductance of the tube is increased. This in effect changes the effective capacitance afforded by tube 4, changing the frequency of the oscillator of which tank circuit 1 forms a part, since the capacitance afforded between anode 5 and cathode 6 of tube 4 is connected directly across tank circuit 1. In this way, control or modulation of the oscillator frequency is achieved.

A brief analysis of the operation of the circuit of Fig. 1 will now be given to fully explain the operation. Let the mutual conductance of tube 4 be denoted by $g_m$, the capacitances of capacitors 8 and 9 each by C (since they are preferably equal), the resistance of resistor 10 by $R_1$, and the resistance afforded by the anode-cathode path 14—15 of tube 13 in parallel with the resistance 12, by $R_2$. Then looking into the reactance tube network at anode 5 and ground, the impedance can be written as $$Z=\frac{1}{g_m}\frac{(S+T_1)(S+T_2)}{S^2} \quad (1)$$

where $$T_1=\frac{1}{CR_1},\ T_2=\frac{1}{CR_2}$$

The resistance of resistor 16 is assumed to be much larger than $R_1$ and $R_2$ and the capacitance of capacitor 11 much larger than C. Letting S become $j\omega$ for real frequencies, we have, $$Z=\frac{1}{g_m}\frac{(j\omega+T_1)(j\omega+T_2)}{-\omega^2} \quad (2)$$

or $$Z=\frac{1}{g_m}\frac{-\omega^2+j\omega(T_1+T_2)+T_1T_2}{-\omega^2} \quad (3)$$

or $$Z=\frac{1}{g_m}\left[1-\frac{T_1T_2}{\omega^2}\right]-j\left[\frac{T_1+T_2}{\omega g_m}\right] \quad (4)$$

Now, the effective reactive component is $$-jX_c=-j\frac{(T_1+T_2)}{\omega g_m} \quad (5)$$

or the effective capacitance is $$C=\frac{1}{\omega X_c}=\frac{g_m}{T_1+T_2} \quad (6)$$

It can be seen, from Equation 4, that there is a real or loss component which varies symmetrically as $\omega$ varies plus or minus with respect to the center frequency. This component introduces amplitude variation when the reactance tube is used with an oscillator. To eliminate this effect it is necessary to make $$1-\frac{T_1T_2}{\omega^2}=0 \quad (7)$$

for any value of $\omega$, or $$T_1T_2=\omega^2 \quad (8)$$

Now, if the reactance tube device is connected to an oscillator in the conventional manner, the frequency of the oscillator will be given by $$\omega^2=\frac{1}{LC}=\frac{1}{L\left[\frac{g_m}{T_1+T_2}\right]}=\frac{T_1+T_2}{g_mL} \quad (9)$$

Then, substituting Equation 8 into Equation 9, we have, for the condition of no amplitude variation, $$T_1T_2=\frac{T_1+T_2}{g_mL} \quad (10)$$

or $$g_mL=\frac{T_1+T_2}{T_1T_2}=\frac{1}{T_1}+\frac{1}{T_2}=R_1C+R_2C \quad (11)$$

If $R_1$ is fixed and $R_2$ varies (one compensating tube, as in Fig. 1), it is thus necessary for the following relation (derived from Equation 11) to hold:

$$R_2=\frac{g_mL}{C}-R_1 \quad (12)$$

The resistance $R_2$ of the compensating tube 13 must thus increase as the $g_m$ of the reactance tube increases, in order to satisfy Equation 12 and thus compensate for or eliminate the amplitude variation which would otherwise arise when the $g_m$ of the reactance tube 4 is varied to vary the oscillator frequency. As illustrated in Fig. 1, the modulating signal is supplied anti-phasally to grids 7 and 19 of the respective tubes 4 and 13, which means that as the voltage applied to one grid (say 7) increases, the voltage applied to the other (grid 19, that is) decreases. An increasing voltage applied to grid 7 increases the $g_m$ of tube 4. At the same time, the decreasing voltage applied to grid 19 makes the dynamic resistance $R_2$ of tube 13 increase. Thus, the resistance $R_2$ varies in the same direction as $g_m$, which is what is required in order to eliminate the amplitude variation, as previously explained in connection with Equation 12. The connections in Fig. 1 are therefore proper.

From the "brief analysis" given above, it may be seen that when the frequency of the oscillator is varied, the reactance of capacitors 8 and 9 also changes, since of course the reactance of these reactive elements depends on the applied frequency. If compensating tube 13 (part of $R_2$ in the above equations) were not utilized, this variation in reactance due to a variation in applied frequency would tend to change the phase shift of the network 8, 9, 10, 12 from 90°, thus causing a resistive component to appear between anode 5 and cathode 6 of the reactance tube 4, and hence also across the oscillator tank circuit 1. The appearance of this resistive component has been demonstrated by the foregoing equations. The resistive component across the tank circuit tends to load the oscillator, resulting in undesirable amplitude modulation of the oscillator output, as previously described. However, if one of the resistances of the phase shift network (such as that provided by the parallel combination of resistor 12 and tube 13) is changed the proper amount to compensate for the change in reactance of capacitors 8 and 9 due to a change in oscillator frequency, the phase shift will remain 90° even for large frequency deviations, thereby preventing the shunt resistance component across the oscillator tank circuit 1 from decreasing from infinity as the frequency is deviated.

According to the present invention, tube 13 functions as a phase shift compensating tube to maintain a 90° phase shift in the phase shift network for large frequency deviations, thereby preventing the shunt resistance component across the oscillator tank circuit 1 from decreasing as the oscillator frequency is deviated. More particularly, the modulating signal voltage applied to grid 19 by way of transformer 18 changes the dynamic resistance of tube 13, thereby varying the resistance $R_2$ of Equation 12, that is, the resistance of the parallel combination of resistor 12 and tube 13. Since this combination is included in the reactance tube phase shift network, the phase shift of this network is then changed. With the proper circuit values, the effective resistance of this parallel combination, which is changed by the same variable voltage (but in opposite phase) that changes the effective capacitance of the reactance tube circuit and thereby the oscillator frequency, may be so changed as to provide a change in phase shift in the phase shift network which exactly compensates or counteracts the change in phase shift which tends to be produced in such network by the changing reactance of capacitors 8 and 9 with changes in oscillator frequency. The resistive component appearing across the oscillator tank circuit 1 is thus maintained high during large frequency deviations of the oscillator, maintaining more constant the amplitude of the oscillator output over these frequency deviations and substantially eliminating amplitude variations.

At high frequencies, a cathode follower stage could be inserted between anode 5 and the input to capacitor 8, to prevent the low impedance of 8, 9 10 and 12 from unduly loading the oscillator tank circuit 1.

Figure 2:
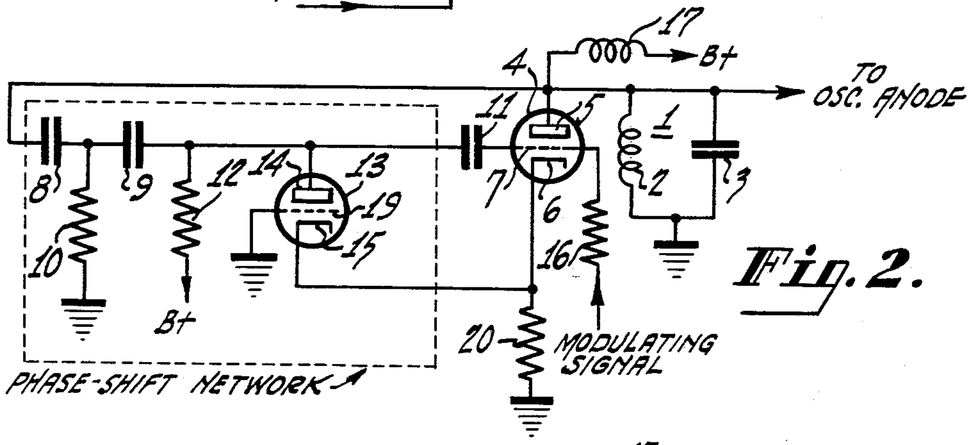
Fig. 2 is a diagram of a modified arrangement for feeding in the modulating signal.

Fig. 2 discloses a somewhat more practical form of the circuit arrangement of Fig. 1. In Fig. 2, parts the same as those of Fig. 1 are denoted by the same reference numerals. In Fig. 2, the application of the modulating signal to tubes 4 and 13 is effected in a different manner from Fig. 1, the circuits being otherwise identical. The modulating signal is fed to grid 7 in Fig. 2 through a resistor 16, as in Fig. 1, but the feed of such signal to the grid 19 of the compensating tube is by cathode coupling between tubes 4 and 13. The cathodes 6 and 15 are coupled by means of a common cathode resistor 20 connected between such cathodes and ground. The grid 19 of tube 13 is grounded.

In Fig. 2, as in Fig. 1, the modulating signal is fed anti-phasally to the grids 7 and 19 of the reactance and compensating tubes 4 and 13, respectively. Therefore, the circuit of Fig. 2 operates exactly similarly to the Fig. 1 circuit, previously described. By means of the cathode coupling of the two tubes in Fig. 2, the proper anti-phasal feed of the modulating signal to the grids of tubes 4 and 13 is effected.

Figure 3:
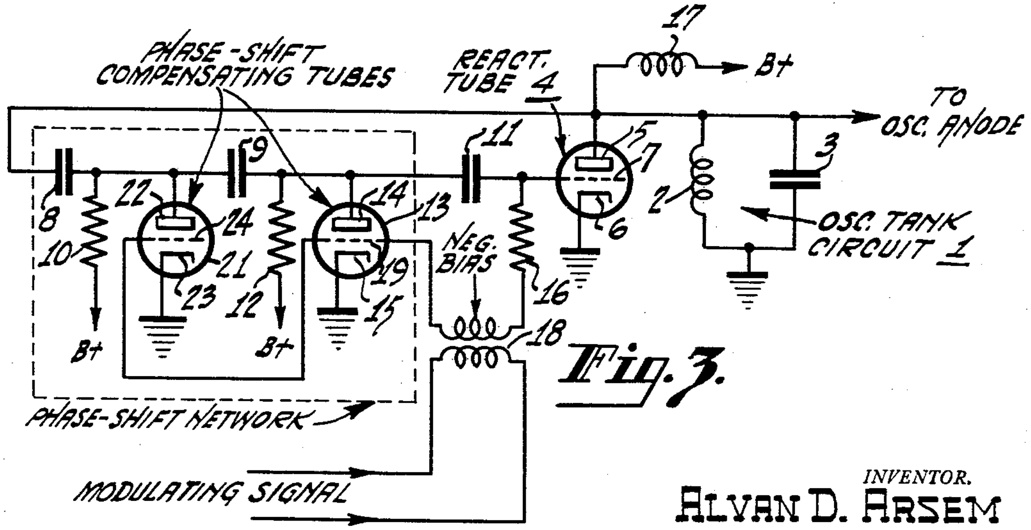
Fig. 3 is a diagram of a modified reactance tube circuit.

Fig. 3 discloses a modified arrangement in which two compensating tubes are used, instead of only one as in Figs. 1 and 2. In Fig. 3, resistor 10 (which is connected between capacitors 8 and 9) has its lower end connected to the positive terminal of the unidirectional source to provide anode potential for a compensating tube 21 the anode 22 of which is coupled to the common junction point of capacitors 8 and 9 and the upper end of resistor 10. The cathode 23 of tube 21 is grounded, so that the anode-cathode path of said tube is connected in parallel with resistor 10 in the phase shift network.

The reactance tube phase shift network of Fig. 3 includes capacitor 8, capacitor 9, the parallel combination of resistor 10 and tube 21 and the parallel combination of resistor 12 and tube 13.

In order to vary the mutual conductance of tube 21 as well as tube 13, thereby causing variation of both $R_1$ and $R_2$ in Equation 11, since in this case $R_1$ is the parallel combination of resistor 10 and tube 21, the grid 24 is connected to grid 19, to receive the same control or modulating signal that is applied to grid 19. Grid 19 (as in Fig. 1) is connected to that end of the modulating signal input transformer 18 which is opposite to that to which grid 7 is connected. In this way, the grids 19 and 24 of the compensating tubes 13 and 21 are each supplied with modulating signal of opposite phase to that supplied to grid 7 of reactance tube 4. The circuit of Fig. 3 operates in the same manner as the circuit of Fig. 1. The same variable voltage (control or modulating signal) that changes the effective capacitance of the reactance tube circuit (through its effect on the $g_m$ of tube 4) also varies the phase shift of the phase shift network, by variation of the total resistance of the parallel combination of resistor 10 and tube 21, and of the total resistance of the parallel combination of resistor 12 and tube 13, through the effect of this variable voltage on the dynamic resistances of the tubes 13 and 21, to the grids of which it is applied. The change in phase shift caused by the variation of these parallel resistance combinations is such as to counteract the change in phase shift which tends to be produced by the changes in the reactances of capacitors 8 and 9 due to changes in oscillatory frequency. Amplitude variations are therefore substantially eliminated. Thus, the frequency deviation allowable (i. e., the deviation without appreciable amplitude modulation) is greatly increased by the reactance tube circuit of this invention.

If $R_1$ and $R_2$, Equation 11, are both varied for compensation of phase-shift, i. e., with two compensating tubes as in Fig. 3, and if they are equal, said equation yields $$R_1=R_2=R=\frac{g_mL}{2C} \qquad (13)$$

That is, the resistance R of the compensating tubes must increase when $g_m$ of the reactance tube increases, in order to eliminate the amplitude variation. This means that the modulating signal must be supplied antiphasally to the reactance tube and the compensating tubes, as illustrated in Fig. 3, since such antiphasal connection provides the desired relation, between compensating tube resistance and $g_m$ of the reactance tube, as previously explained in connection with Fig. 1.

From a comparison of Equations 12 and 13, it may be seen that, if only $R_2$ is varied, the average value of resistance of the single compensating tube differs in amplitude from the R if both $R_1$ and $R_2$ are varied, and that $R_2$ also differs in slope from R by a factor of two.

What is claimed is:

1. In combination, a resonant circuit wherein oscillatory energy appears, an electron discharge device having at least electron-emitting, electron-receiving and control electrodes, means connecting said electron-emitting and electron-receiving electrodes directly across said resonant circuit, a phase shift network including a plurality of impedance elements coupling said control electrode to said resonant circuit to feed phasal shifted oscillatory energy to said control electrode, whereby said device functions as an electronic simulated reactance, and means for varying the impedance of at least one of the impedance elements of said network in response to a variable control signal to thereby vary the amount of phase shift provided by said network.

2. In combination, a resonant circuit wherein oscillatory energy appears, an electron discharge device having at least electron-emitting, electron-receiving and control electrodes, means connecting said electron-emitting and electron-receiving electrodes directly across said resonant circuit, a phase shift network including a plurality of impedance elements coupling said control electrode to said resonant circuit to feed phase shifted oscillatory energy to said control electrode, whereby said device functions as an electronic simulated reactance, a signal-responsive variable impedance element included as a part of said network, and means for applying a variable control signal to said impedance element to vary the same.

3. The combination recited in claim 2, wherein the variable impedance element is connected in parallel with a fixed impedance element, the parallel combination constituting one of the impedance elements of the phase shift network.

4. The combination recited in claim 2, wherein two signal-responsive variable impedance elements are utilized, each variable impedance element being connected in parallel with a respective fixed impedance element and each parallel combination constituting a respective impedance element of the phase shift network.

5. In combination, a resonant circuit wherein oscillatory energy appears, an electron discharge device having at least electron-emitting, electron-receiving and control electrodes, means connecting said electron-emitting and electron-receiving electrodes directly across said resonant circuit, a phase shift network including a plurality of impedance elements coupling said control electrode to said resonant circuit to feed phase shifted oscillatory energy to said control electrode, a controllable electron flow device included as a part of said network, and means for applying a variable control signal to said last-named device to vary the impedance provided thereby.

6. The combination recited in claim 5, wherein the electron flow device has its anode-cathode path connected in parallel with a fixed impedance element, the parallel combination constituting one of the impedance elements of the phase shift network.

7. In combination, a resonant circuit wherein oscillatory energy appears, an electron discharge device having at least electron-emitting, electron-receiving and control electrodes, means connecting said electron-emitting and electron-receiving electrodes directly across said resonant circuit, a phase shift network including a plurality of impedance elements coupling said control electrode to said resonant circuit to feed phase shifted oscillatory energy to said control electrode, an electron tube having anode, cathode and grid electrodes, means connecting the anode-cathode path of said tube in parallel with one of the impedance elements of said network, and means for applying a variable control signal to said grid to vary the impedance of said anode-cathode path.

8. The combination recited in claim 7, wherein two electron tubes are utilized, each tube having its anode-cathode path connected in parallel with a respective fixed impedance element and each parallel combination constituting a respective impedance element of the phase shift network.

9. In combination, a resonant circuit wherein oscillatory energy appears, an electron discharge device having at least electron-emitting, electron-receiving and control electrodes, means connecting said electron-emitting and electron-receiving electrodes directly across said resonant circuit, a phase shift network including a plurality of impedance elements coupling said control electrode to said resonant circuit to feed phase shifted oscillatory energy to said control electrode, whereby said device functions as an electronic simulated reactance, means for applying a modulating signal to said control electrode to vary the reactance afforded by said device, and means for varying the impedance of at least one of the impedance elements of said network in response to said modulating signal to thereby vary the amount of phase shift provided by said network.

10. In combination, a resonant circuit wherein oscillatory energy appears, an electron discharge device having at least electron-emitting, electron-receiving and control electrodes, means connecting said electron-emitting and electron-receiving electrodes directly across said resonant circuit, a phase shift network including a plurality of impedance elements coupling said control electrode to said resonant circuit to feed phase shifted oscillatory energy to said control electrode, whereby said device functions as an electronic simulated reactance, means for applying a modulating signal to said control electrode to vary the reactance afforded by said device, a controllable electron flow device constituting one of said impedance elements, and means for applying said modulating signal to said last-named device to vary the impedance provided thereby.

11. The combination recited in claim 10, wherein the modulating signal is applied antiphasally to said control electrode and to said electron flow device.

References Cited in the file of this patent

UNITED STATES PATENTS

| | | |
|---|---|---|
| 2,321,269 | Artzt | June 8, 1943 |
| 2,382,198 | Bollinger | Aug. 14, 1945 |
| 2,445,508 | Beleskas | July 20, 1948 |
| 2,474,261 | Liebe et al. | June 28, 1949 |
| 2,521,694 | Crosby | Sept. 12, 1950 |
| 2,566,405 | De Lange et al. | Sept. 4, 1951 |